US012586488B2

(12) United States Patent
Green et al.

(10) Patent No.: US 12,586,488 B2
(45) Date of Patent: Mar. 24, 2026

(54) PHOTOLUMINESCENT SIGNAGE FOR LOW LIGHT AMBIENT ENVIRONMENT

(71) Applicant: EVP International, LLC, Cincinnati, OH (US)

(72) Inventors: Zachary L. Green, Cincinnati, OH (US); Kenneth W. Miller, Cincinnati, OH (US)

(73) Assignee: EVP International, LLC, Cincinnati, OH (US)

( * ) Notice: Subject to any disclaimer, the term of this patent is extended or adjusted under 35 U.S.C. 154(b) by 0 days.

(21) Appl. No.: 16/401,568

(22) Filed: May 2, 2019

(65) Prior Publication Data

US 2019/0259313 A1 Aug. 22, 2019

Related U.S. Application Data

(63) Continuation-in-part of application No. 16/128,743, filed on Sep. 12, 2018, now abandoned, which is a continuation of application No. 15/320,859, filed as application No. PCT/US2015/036174 on Jun. 17, 2015, now Pat. No. 10,127,843.

(60) Provisional application No. 62/024,563, filed on Jul. 15, 2014.

(51) Int. Cl.

| | |
|---|---|
| ***G09F 13/20*** | (2006.01) |
| ***G09F 13/08*** | (2006.01) |
| ***G09F 13/18*** | (2006.01) |
| *G09F 13/04* | (2006.01) |

(52) U.S. Cl.

CPC .............. *G09F 13/20* (2013.01); *G09F 13/08* (2013.01); *G09F 13/18* (2013.01); *G09F 2013/05* (2021.05)

(58) Field of Classification Search

CPC ............................ G09F 13/20; G09F 2013/05

See application file for complete search history.

(56) References Cited

U.S. PATENT DOCUMENTS

| | | | |
|---|---|---|---|
| 1,654,370 | A | 12/1927 | Goetschius |
| 2,372,124 | A | 3/1945 | Schenkel |
| 2,383,884 | A | 8/1945 | Palmquist |
| 2,387,512 | A | 10/1945 | Hilberg |
| 2,994,149 | A | 8/1961 | Endelson |
| 3,176,420 | A | 4/1965 | Alverson |
| 3,552,702 | A | 1/1971 | Springer |
| 3,591,941 | A | 7/1971 | Jaffe, Jr. |

(Continued)

FOREIGN PATENT DOCUMENTS

| | | | |
|---|---|---|---|
| CA | 2771287 | A1 | 9/2012 |
| CN | 201397644 | Y | 2/2010 |

(Continued)

OTHER PUBLICATIONS

ASTM, Standard Specification for Photoluminescent (Phosphorescent) Safety Markings, 2014, Compass, p. 3 (Year: 2014).*

(Continued)

*Primary Examiner* — Gary C Hoge
(74) *Attorney, Agent, or Firm* — FBT GIBBONS LLP

(57) ABSTRACT

A non-powered photoluminescent sign can be charged in low light conditions. The message is viewable with ambient light and without ambient light at a distance of 50 feet. Methods and other photoluminescent signs are also provided.

18 Claims, 9 Drawing Sheets

(56) References Cited

U.S. PATENT DOCUMENTS

| | | | |
|---|---|---|---|
| 4,016,665 A | 4/1977 | Sakota | |
| 4,250,646 A | 2/1981 | Trachtenberg | |
| 4,263,739 A | 4/1981 | Lee | |
| 4,420,898 A | 12/1983 | Moses | |
| 4,918,578 A | 4/1990 | Thompson | |
| 5,009,019 A | 4/1991 | Erlendsson et al. | |
| 5,277,146 A | 1/1994 | Hughes, Jr. | |
| 5,283,968 A | 2/1994 | Williams | |
| 5,355,117 A | 10/1994 | Jefferson | |
| 5,415,911 A * | 5/1995 | Zampa | B32B 37/12 359/529 |
| 5,428,913 A | 7/1995 | Hillstrom | |
| 5,536,558 A | 7/1996 | Shelton | |
| 5,829,177 A | 11/1998 | Hjaltason | |
| 5,873,187 A | 2/1999 | Kozak et al. | |
| 5,904,017 A | 5/1999 | Glatz et al. | |
| 6,305,109 B1 | 10/2001 | Lee | |
| 6,475,586 B1 | 11/2002 | Ikawa | |
| 6,493,973 B1 | 12/2002 | Nelson | |
| 6,499,421 B1 | 12/2002 | Honigsbaum | |
| 6,601,328 B1 | 8/2003 | Benaquista et al. | |
| 6,785,992 B2 | 9/2004 | Chiarucci | |
| 6,843,010 B2 | 1/2005 | Robinson et al. | |
| 6,896,388 B2 | 5/2005 | George et al. | |
| 7,162,821 B2 | 1/2007 | Venkataraman et al. | |
| 7,412,790 B2 | 8/2008 | Riopel et al. | |
| 7,698,843 B2 | 4/2010 | Hillstrom et al. | |
| D625,363 S | 10/2010 | Lee | |
| 8,046,943 B2 | 11/2011 | Kay | |
| 8,499,480 B2 | 8/2013 | Schlasinger | |
| 8,836,212 B2 | 9/2014 | Skipor et al. | |
| 2004/0154199 A1 | 8/2004 | Robinson et al. | |
| 2004/0202812 A1 | 10/2004 | Congard et al. | |
| 2004/0245764 A1 | 12/2004 | Bolta | |
| 2005/0102871 A1 | 5/2005 | Merle et al. | |
| 2005/0127263 A1 | 6/2005 | Lemire | |
| 2005/0198879 A1 | 9/2005 | Hannington | |
| 2006/0080873 A1 | 4/2006 | Riopel et al. | |
| 2006/0096141 A1 | 5/2006 | Presley et al. | |
| 2006/0225328 A1 * | 10/2006 | Hasan | G09F 13/18 40/570 |
| 2007/0240346 A1 | 10/2007 | Li et al. | |
| 2009/0229510 A1 | 9/2009 | Sutter | |
| 2010/0018092 A1 | 1/2010 | Peckham | |
| 2011/0239504 A1 | 10/2011 | Keuning | |
| 2012/0124873 A1 | 5/2012 | Lee | |
| 2012/0144710 A1 | 6/2012 | Casterline | |
| 2012/0233895 A1 | 9/2012 | Martin et al. | |
| 2013/0019509 A1 | 1/2013 | Smith et al. | |
| 2013/0255118 A1 | 10/2013 | Warren | |
| 2014/0031754 A1 * | 1/2014 | Williams | A61M 39/1011 604/175 |
| 2016/0027266 A1 | 1/2016 | Mc Donagh et al. | |
| 2016/0216417 A1 | 7/2016 | Cross et al. | |
| 2017/0165997 A1 | 6/2017 | Holmes | |

FOREIGN PATENT DOCUMENTS

| | | | |
|---|---|---|---|
| RU | 2533667 | C2 | 11/2014 |
| SU | 1583965 | A1 | 8/1990 |
| WO | 2004044875 | A1 | 5/2004 |
| WO | 2009025566 | A1 | 2/2009 |

OTHER PUBLICATIONS

Junge, Kristina; Office Action issued in U.S. Appl. No. 16/128,743; Jun. 19, 2019; 10 pages.

Lukashina, E.; International Search Report and Written Opinion of the International Searching Authority issued in International App. No. PCT/US2015/036174; Oct. 8, 2015; 8 pages.

Innova Solutions; Glo-Brite 520 Class B—photoluminescent laminating film product information; retrieved from http://innovasolutions.co.uk/products/photoluminescent/glo-brite-520 . . . on Jul. 4, 2014; 2 pages.

American Permalight Inc.; Main Catalog 2014, Photoluminescent Safety Products and Bumper Guards; published Jan. 2014; 20 pages.

* cited by examiner

WITH AMBIENT LIGHTING

WITH NO AMBIENT LIGHTING

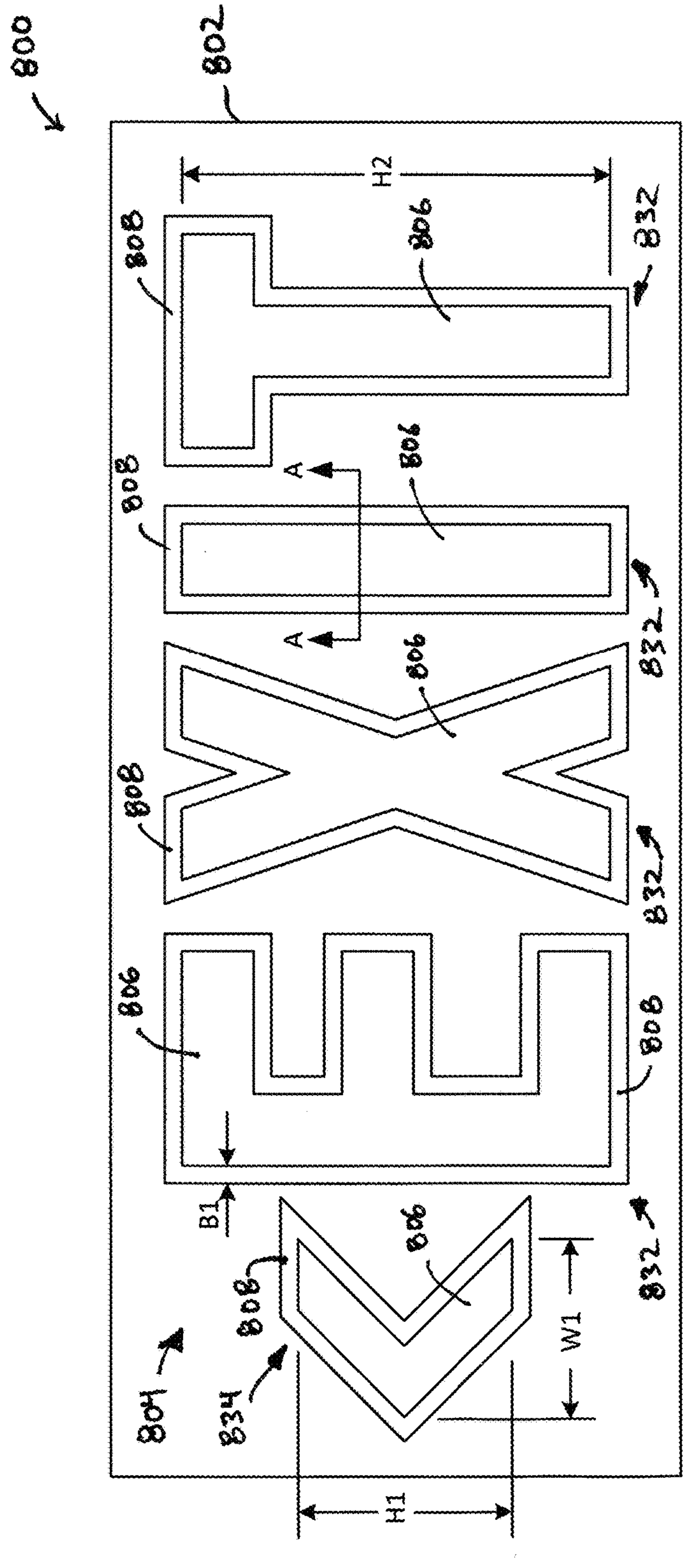
FIG. 12
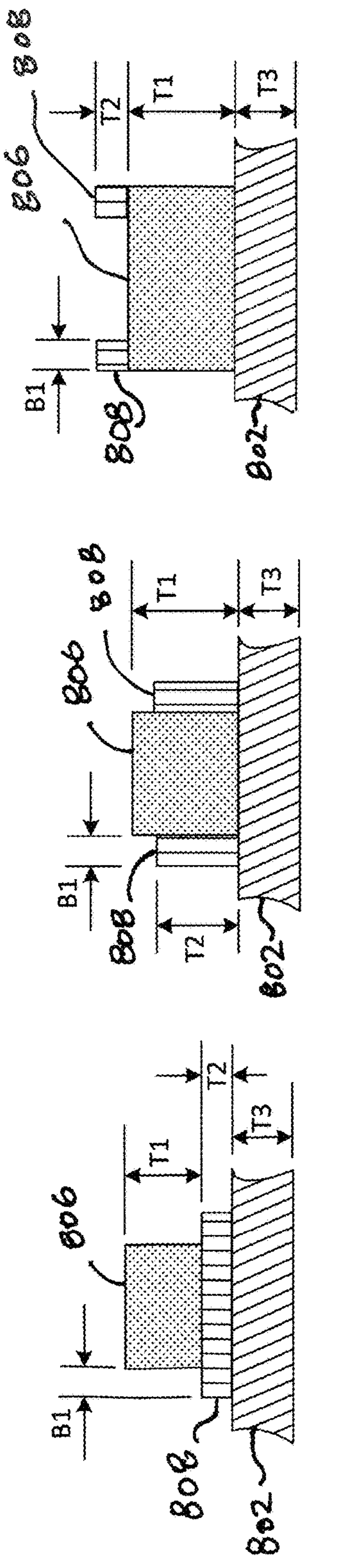
FIG. 13A
FIG. 13B
FIG. 13C

PHOTOLUMINESCENT SIGNAGE FOR LOW LIGHT AMBIENT ENVIRONMENT

REFERENCE TO RELATED APPLICATIONS

This application is a continuation-in-part of U.S. patent application Ser. No. 16/128,743 filed on Sep. 12, 2018, which is a continuation of U.S. patent application Ser. No. 15/320,859, issuing as U.S. Pat. No. 10,127,843 on Nov. 13, 2018, which is a U.S. national stage entry of PCT/US2015/036174 filed Jun. 17, 2015, which claims priority of U.S. provisional patent application Ser. No. 62/024,563, filed Jul. 15, 2014, and hereby incorporates each of these applications by reference herein in its respective entirety.

TECHNICAL FIELD

Embodiments of the technology relate, in general, to photoluminescent signage. More particularly, embodiments of the technology relate to non-powered photoluminescent signage for use in environments having low levels of ambient lighting.

BACKGROUND

Various types of illuminated signs can be used for indicating location of safety equipment and other objects, showing directions for normal or emergency egress, and/or providing warnings. These signs can act as important safety measures, particularly during emergencies. Existing signs may require electricity or some other source of power to illuminate or display the information contained thereon. However, such conventional signs are deficient in several ways. For example, powered signage can be expensive to install and maintain. Additionally, should the power source be interrupted or otherwise fail to function, the sign may not adequately serve its purpose during emergency or non-emergency situations. Finally, the general aesthetics of the signage may be undesirable for a particular space or usage.

BRIEF DESCRIPTION OF THE DRAWINGS

It is believed that certain embodiments will be better understood from the following description taken in conjunction with the accompanying drawings, in which like references indicate similar elements and in which:

FIG. 12 depicts another example photoluminescent sign in accordance with a non-limiting embodiment.

FIGS. 13A-13C are example cross-sectional views taken along line A-A in FIG. 12.

DETAILED DESCRIPTION

Figure 1:
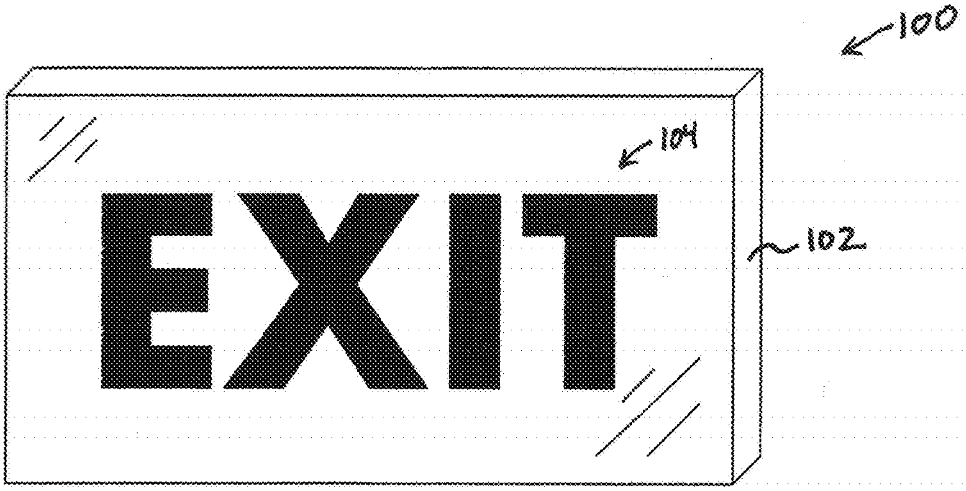
FIGS. 1-3 depict example photoluminescent signs in accordance with various non-limiting embodiments.

Various non-limiting embodiments of the present disclosure will now be described to provide an overall understanding of the principles of the structure, function, and use of photoluminescent signage disclosed herein. One or more examples of these non-limiting embodiments are illustrated in the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment, or "in an embodiment" in places throughout the specification are not necessarily all referring to the same embodiment. Furthermore, the particular features, structures or characteristics may be combined in any suitable manner in one or more embodiments.

Described herein are example embodiments of photoluminescent signage and methods of manufacture. The examples discussed herein are examples only and are provided to assist in the explanation of the apparatuses, devices, systems and methods described herein. None of the features or components shown in the drawings or discussed below should be taken as mandatory for any specific implementation of any of these apparatuses, devices, systems or methods unless specifically designated as mandatory. For ease of reading and clarity, certain components, or methods may be described solely in connection with a specific figure. Any failure to specifically describe a combination or sub-combination of components should not be understood as an indication that any combination or sub-combination is not possible. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

The present disclosure is generally directed to non-powered photoluminescent signs that do not utilize external or on-board power sources. As described in more detail below, the photoluminescent signs can have a generally clear substrate on which a message is applied. The message can comprise photoluminescent graphics, letters, or combinations thereof. The particular message can vary depending on application or use. Example messages can indicate points of egress, indicate location of objects (such as stairs, fire alarms, fires hoses, or fire extinguishers), or otherwise provide information to a viewer of the photoluminescent sign. Since the message is photoluminescent, it is viewable in situations where there is little to no ambient lighting, as may be experienced during an emergency event. In some embodiments, the only portion of the photoluminescent sign that is opaque is the message. In other embodiments, other portions of the photoluminescent sign besides the message can be opaque, such as points of attachment and other generally incidental portions. In some embodiments, the opaque portions of the photoluminescent signs are substantially photoluminescent. In some embodiments, the photoluminescent portions of the opaque portions are outlined by a border, such as a reflective border.

Figure 2:
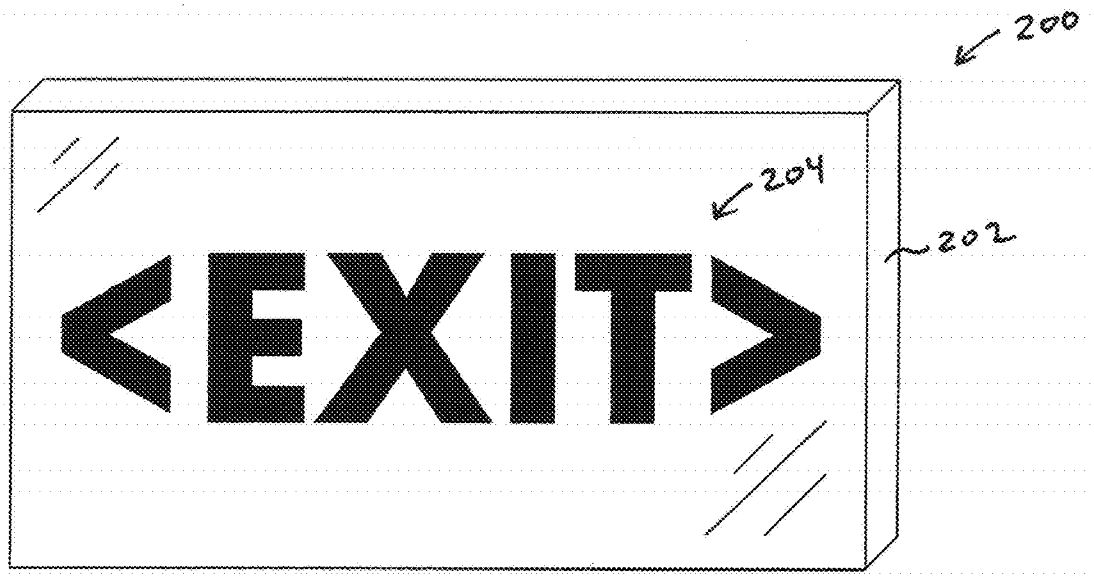
Figure 3:
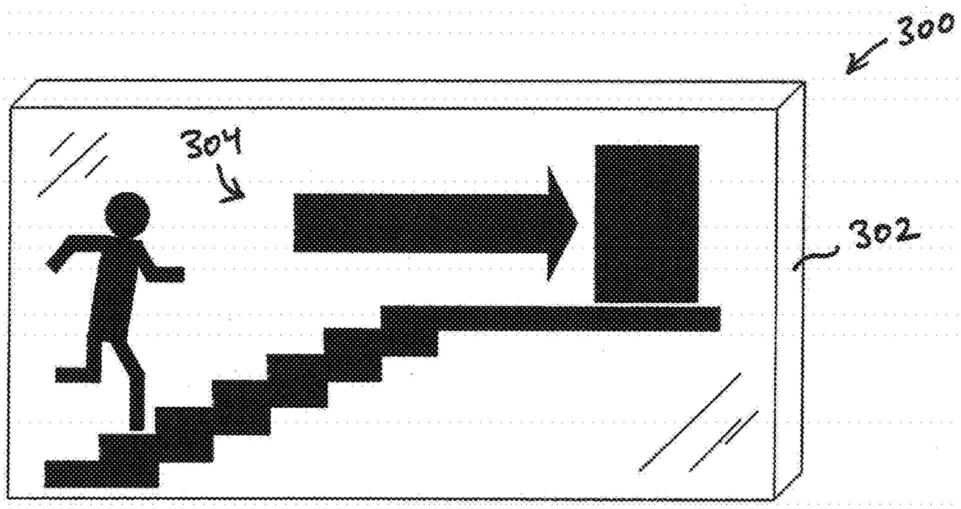

FIGS. 1-3 depict example photoluminescent signs in accordance with various non-limiting embodiments. As is to be appreciated, the particular font, size and layout of the photoluminescent signs described herein can vary based on application. Referring first to FIG. 1, a photoluminescent sign 100 has a transparent or clear substrate 102. The clear substrate 102 can be any suitable material that provides the desired rigidity and aesthetics, such as glass, plastic, acrylic, Plexiglas® or Lexan™, for example. The size of clear substrate 102 can be any suitable size. In some embodiments, the height of the clear substrate 102 can be in the range of about 6 inches to about 14 inches. In some embodiments, the width of the clear substrate 102 can be in the range of about 6 inches to about 14 inches. In some embodiments, the thickness of the clear substrate 102 can be in the range of about ⅛ inch to about ½ inch. The photoluminescent sign 100 also has a message 104 that is applied, printed or otherwise attached to the clear substrate 102. The size of the message 104 can depend, for example, on a desired visibility distance. In some embodiments, the message 104 is about 6 inches high. The message 104 can be positioned on either the front surface of the clear substrate 102 (as shown) or the rear surface of the clear substrate 102. The message 104 can be photoluminescent such that the message 104 is viewable in low-light conditions. The photoluminescent sign 100 is shown to have translucent portions and opaque portions, the opaque portions defined by the message 104 and the translucent portions defined by the portions of the clear substrate 102 that are not covered by the message 104.

The particular message delivered by the photoluminescent signage described herein can vary based on application. FIG. 2, for example, depicts an example embodiment of a photoluminescent sign 200 having a message 204 that comprises both text and graphics. The photoluminescent sign 200 is shown to be otherwise generally similar to the photoluminescent sign 100 and to have a clear substrate 202. The example message 204 depicted in FIG. 2 includes directional arrows in addition to text. FIG. 3 depicts an example embodiment of a photoluminescent sign 300 that has a non-text message 304. Similar to FIG. 1 and FIG. 2, the photoluminescent sign 300 is shown to have clear substrate 302 on which the message 304 is applied.

Figure 4:
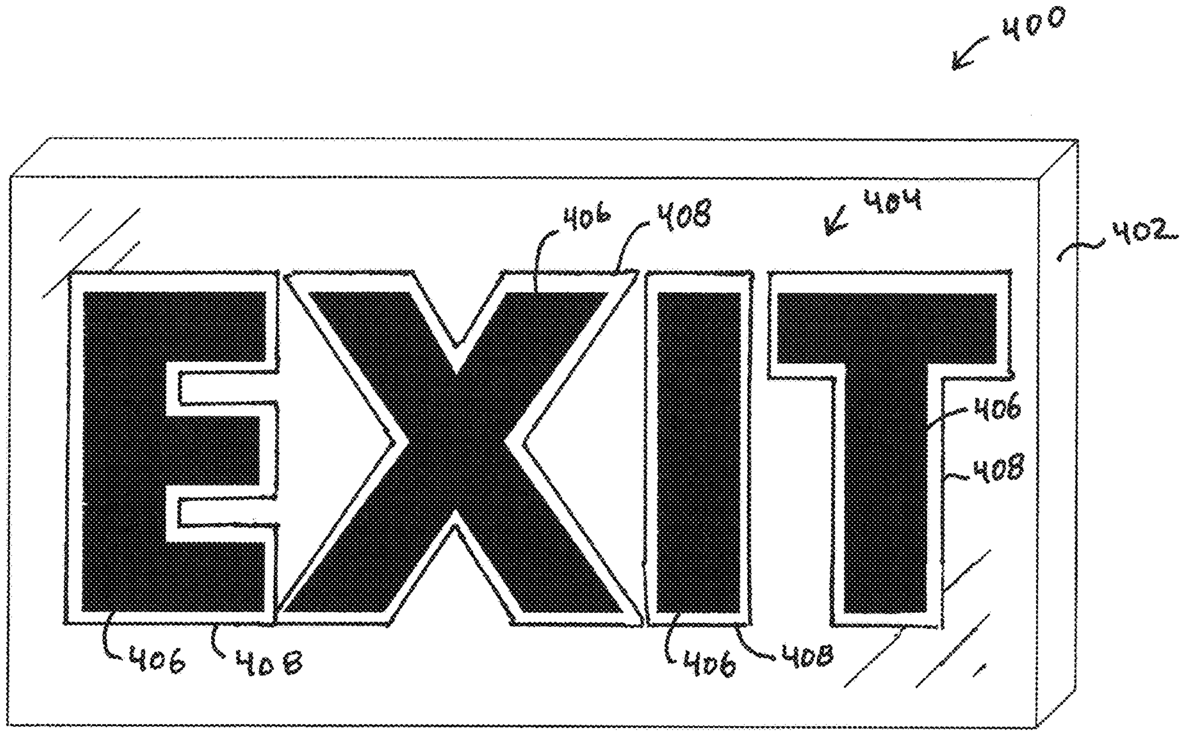
FIG. 4 depicts an example photoluminescent sign having a message that is applied to a clear substrate.

In some embodiments the entire message is photoluminescent, while in other embodiments a portion of the message is photoluminescent and the remaining portion of the message is opaque. FIG. 4 depicts an example photoluminescent sign 400 having a message 404 that is applied to a clear substrate 402. The message 404 is shown to include a photoluminescent portion 406 and an opaque portion 408 that is not photoluminescent. In the illustrated embodiment, the opaque portion 408 is a border around each letter in the message. As is to be appreciated, similar opaque portions can also border graphical elements, such as directional arrows, stairs, and the like. In some embodiments the opaque portion 408 comprises a reflective material to aid in visibility. For example, the opaque portion 408 can be colored reflective film, such as a red or green film. In other embodiments, the opaque portion 408 can be white, black, or any other suitable color. The particular thickness of the opaque portion 408 relative to the photoluminescent portion 406 can vary. As depicted in FIG. 4, in some embodiments, the photoluminescent portion 406 can dominate the visual impression of the message. In some alternative embodiments, the border portions of the message can be photoluminescent and the interior portions of the message can be non-photoluminescent.

Figure 5:
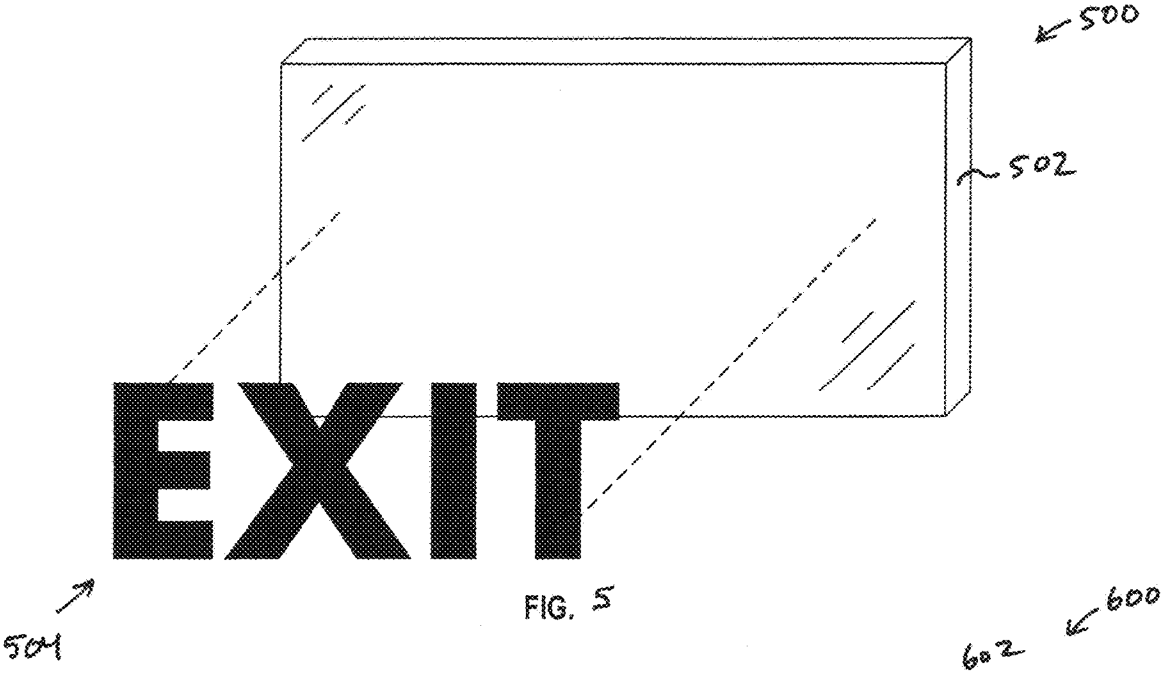
FIGS. 5 and 6 depict exploded views of example photoluminescent signs.
Figure 6:
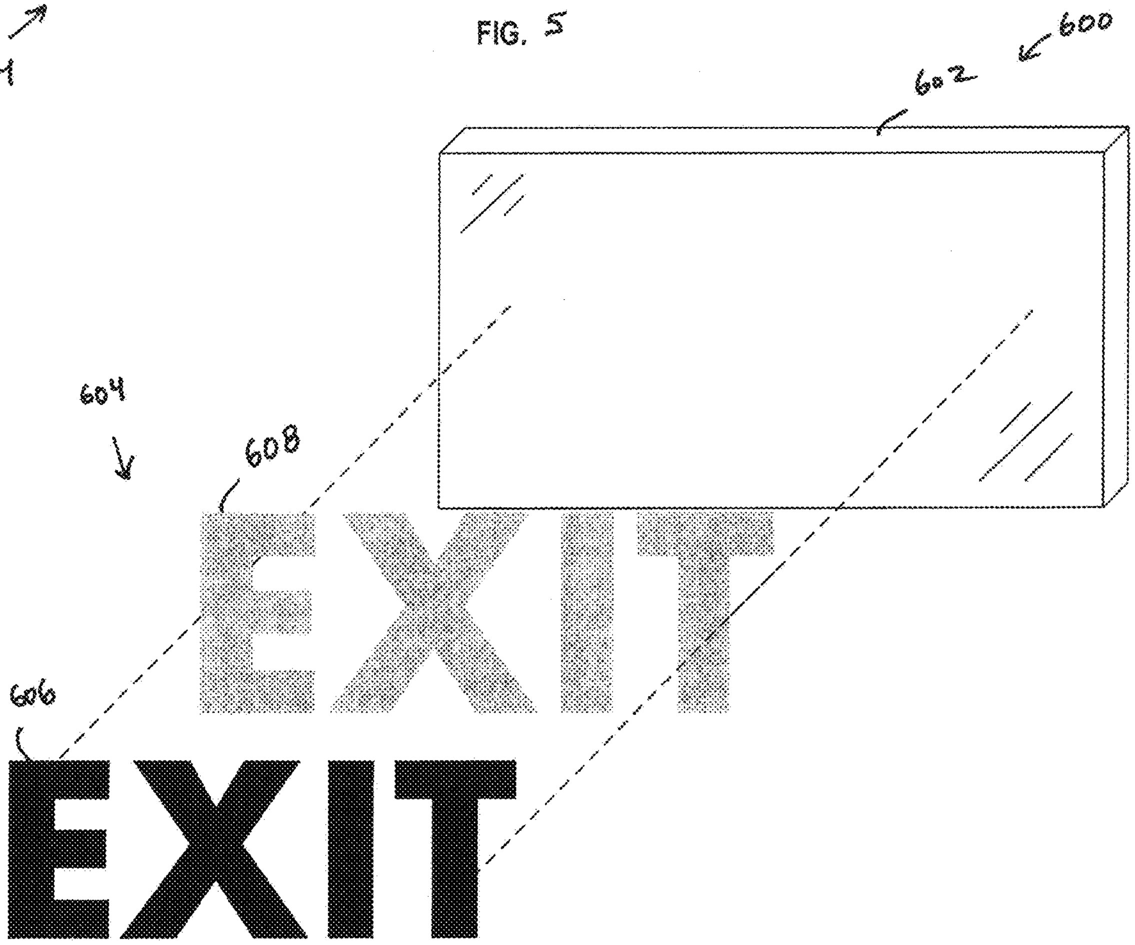

FIGS. 5 and 6 depict exploded views of example photoluminescent signs 500 and 600, respectively. The photoluminescent sign 500 has a message 504 that is entirely photoluminescent whereas the photoluminescent sign 600 has a message 604 that comprises both photoluminescent portions 606 and opaque portions 608. Referring first to FIG. 5, the letters of the message 504 can comprise of vinyl-type film that is infused with photoluminescent pigment. During manufacturing, the letters of the message 504 can be applied to the clear substrate 502 using any suitable adhesive or bonding agent. In some embodiments, pressure can be applied to the letters of message 504 using a roller or other technique to remove air bubbles and wrinkles. Referring now to FIG. 6, the letters of opaque portion 608 of the message 604 can be sized to be larger than the photoluminescent portions 606 of the message. In one embodiment, the photoluminescent portions 606 can be joined with the opaque portions 608 and then the assembly is applied to the clear substrate 602. In another embodiment, the opaque portions 608 are first applied to the clear substrate 602 and then the photoluminescent portions 606 are subsequently applied to the clear substrate 602 such that they overlay the opaque portions 608.

Figure 7:
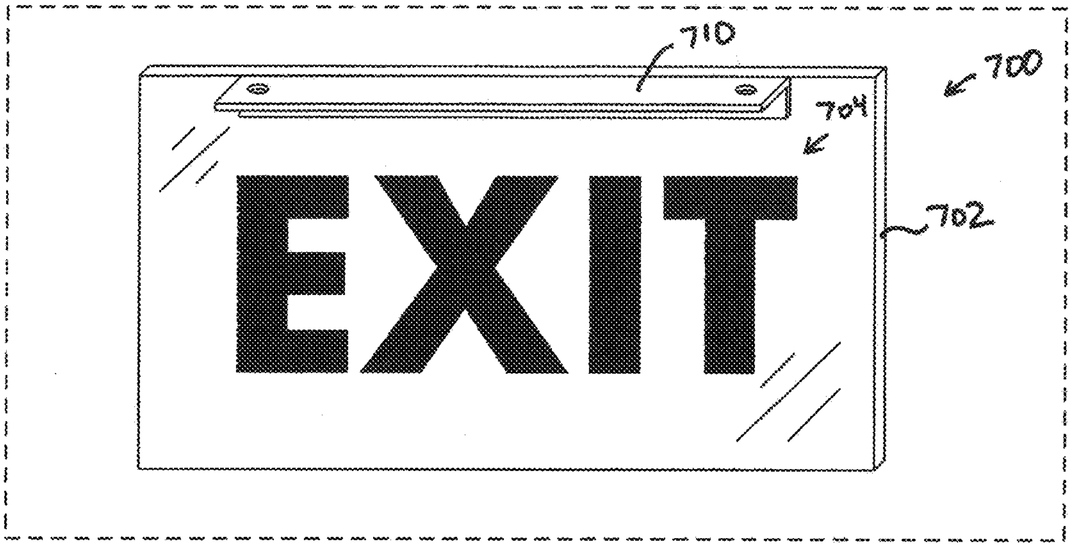
FIG. 7 depicts an example photoluminescent sign positioned in an environment having sufficient ambient lighting.
Figure 8:
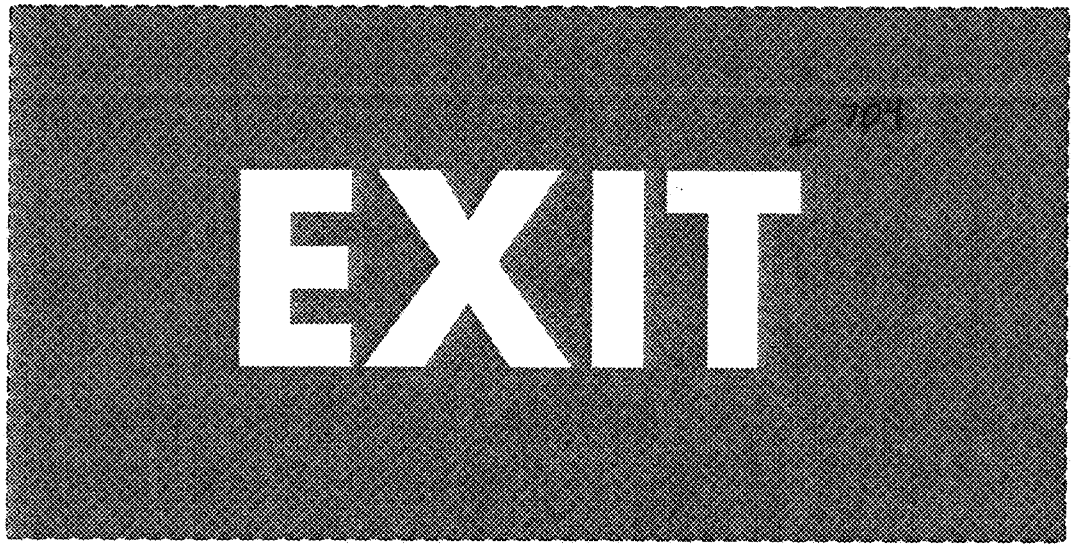
FIG. 8 depicts the photoluminescent sign of FIG. 7 with no ambient lighting.

FIG. 7 depicts an example photoluminescent sign 700 positioned in an environment having sufficient ambient lighting. The photoluminescent sign 700 has a mounting bracket 710 to assist with securing the photoluminescent sign 700 to a structure. Other types of mounting brackets or fixtures can be additionally or alternatively used. FIG. 8 depicts the photoluminescent sign 700 with no ambient lighting and as shown, the message 704 is viewable due to its photoluminescence.

Figure 9:
FIGS. 9-11 show an example photoluminescent sign in accordance with the present disclosure.
Figure 10:
Figure 11:

FIGS. 9-11 show an example photoluminescent sign in accordance with the present disclosure. FIGS. 9-10 depict the photoluminescent sign having a green reflective border around photoluminescent letters. FIG. 11 depicts the photoluminescent sign upon the removal of ambient lighting.

FIG. 12 depicts another example photoluminescent sign 800 having a message 804 that is applied to a substrate 802. The substrate 802 can be trasparent, opaque, or translucent, or include portions that have different levels of transparency. Further, the substrate 802 can be formed from any suitable rigid material, such as glass, plastics, metals, or combinations of materials. In some embodiments, the substrate 802 is mirrored or at least partially reflective. Such embodiments can be manufactured using any suitable process. For example, if the substrate 802 is clear, a mirrored or reflective substrate, such as a film, can be applied to a rear surface of the substrate 802 and the message 804 can be applied to the front surface. Thus, in such an arrangement, an observer of the photoluminescent sign 800 can read the message 804 that is visually surrounded by a mirrored plane, as viewable through the clear substrate. In other embodiments, a mirrored or reflective substrate can be applied to a front surface of the substrate 802 with the message 804 then applied to the front surface of the mirrored or reflective substrate.

The message 804 is shown to include a photoluminescent portion 806 and a non-glowing border 808, which is opaque and not photoluminescent. As shown, the message 804 can include letters 832 (shown as letters "EXIT") as well as a directional indicator 834. While FIG. 12 depicts the message 804 having a single directional indicator 834, in other embodiments multiple directional indicators can be used, as shown in FIG. 2, for example. Similar to the embodiments described above, the photoluminescent portion 806 can facilitate visibility and readability of the message 804 without ambient lighting, and the non-glowing border 808 can facilitate visibility and readability of the message 804 with ambient lighting. The non-glowing border 808 can be colored red, green, or other suitable color, in order to increase visibility and readability of the message 804. Further, in some embodiments the non-glowing border 808 is reflective to increase the visibility of the message 804.

As shown in FIG. 12, the photoluminescent portion 806 of the directional indicator 834 can have a height (shown as H1) and a width (shown as W1). In accordance with various embodiments, the height (H1) of the photoluminescent portion 806 of the directional indicator 834 is at least 80 mm and the width (W1) of the photoluminescent portion 806 of the directional indicator 834 is at least 70 mm. For example, the height (H1) of the photoluminescent portion 806 of the directional indicator 834 can be about 82 mm and the width (W1) of the photoluminescent portion 806 of the directional indicator 834 can be about 72 mm.

The photoluminescent portion 806 of the letters 832 of the message 804 can have a height (shown as H2). In accordance with various embodiments, the photoluminescent portion 806 of each photoluminescent letter 832 can have a height (H2) of at least 170 mm. For example, the photoluminescent portion 806 of each photoluminescent letter 832 can have a of height (H2) of about 178 mm. In one embodiment, as shown in FIG. 12, the height (H1) of the photoluminescent portion 806 of the directional indicator 834 can be about half the height (H2) of the photoluminescent portion 806 of the letters to aid in the viewing of the directional indicator 834 in various operational conditions.

FIGS. 13A-13C depict example cross-sectional views of FIG. 12 taken along line A-A to show example non-limiting arrangements of the photoluminescent portion 806 and the non-glowing border 808 of the message 804. While for the purposes of illustration the cross-sectional views of FIGS. 13A-13C show example cross-sectional views of the letter "I", it is to be appreciated that the directional indicator 834 can have similar cross-sectional configurations. Moreover, the photoluminescent letters 832 and the directional indicator 834 can each have a variety of other cross-sectional configurations besides those shown in FIGS. 13A-13C without departing from the scope of the current disclosure.

Referring first to FIG. 13A, the non-glowing border 808 is shown extending from underneath the photoluminescent portion 806. This arrangement is similar to, for example, the arrangement of the photoluminescent sign 600 depicted in FIG. 6. The non-glowing border 808 can have a width (shown as B1) of about 2.5 mm. Further, the photoluminescent portion 806 can have a thickness (shown as T1) of about 4 mm. A thickness of the clear substrate 802 (shown as T3) can be at least 3 mm. The non-glowing border 808 can have any suitable thickness (shown as T2). For non-glowing borders 808 that are formed from a film, for example, the thickness (T2) can be relatively thin compared to the thickness (T1) of the photoluminescent portion 806. By comparison, non-glowing borders 808 that are formed from other substrates or using other techniques can have a thickness (T2) that is equal to or greater than the thickness (T1) of the photoluminescent portion 806.

FIG. 13B depicts an example alternative arrangement of the photoluminescent portion 806 and the non-glowing border 808 of the message 804 shown in FIG. 12. In this arrangement, the non-glowing border 808 can have a width (B1) of about 2.5 mm. As shown, the thickness (T1) of the photoluminescent portion 806, which can be about 4 mm, for example, can be greater than the thickness (T2) of the non-glowing border 808. In other embodiments, however, the thickness (T2) of the non-glowing border 808 can be equal to or greater than the thickness (T1) of the photoluminescent portion 806. Similar to FIG. 13A, a thickness of the clear substrate 802 (T3) can be at least 3 mm.

FIG. 13C depicts yet another example alternative arrangement of the photoluminescent portion 806 and the non-glowing border 808 of the message 804 shown in FIG. 12. In this arrangement, the non-glowing border 808 can have a width (B1) of about 2.5 mm and the photoluminescent portion 806 can have a thickness (T1) of about 4 mm. Here, the non-glowing border 808 is applied to a top surface of the photoluminescent portion 806. The thickness (T2) of the non-glowing border 808 can depend on, for example, the type of material or process utilized to form or apply the non-glowing border 808. A thickness of the clear substrate 802 (T3) can be at least 3 mm.

Figure 14:
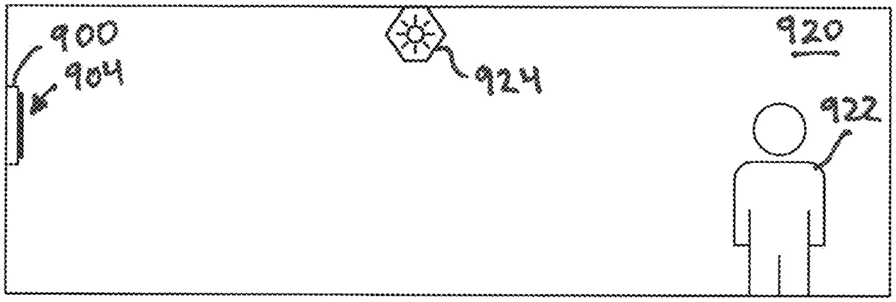
FIG. 14 depicts charging of an example photoluminescent sign positioned in an environment.
Figure 15:
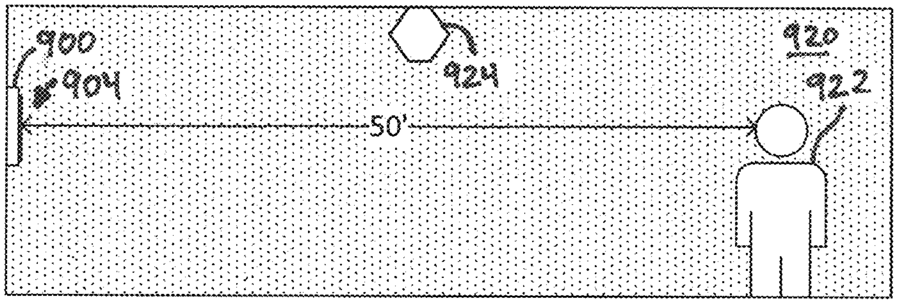
FIG. 15 depicts readability of the photoluminescent sign of FIG. 14 subsequent to removal of ambient lighting from the environment.

Referring now to FIGS. 14-15, an example operational implementation of a photoluminescent sign 900 is depicted. The photoluminescent sign 900 can have a message 904, similar to the message 804 shown in FIG. 12, for example. As such, the message 904 can have a photoluminescent portion and a non-glowing border. Referring first to FIG. 14, the photoluminescent sign 900 is shown positioned in an environment 920 and not connected to a power source. Ambient lighting 924 is initially present in the environment 920 to charge the photoluminescent portion of the photoluminescent sign 900. In various embodiments, the ambient lighting 924 is provided by unfiltered fluorescent lighting, metal halide lighting, mercury vapor lighting, or LED lighting.

In some embodiments, the photoluminescent portion of the message 904 is charged with ambient lighting of less than 5 foot-candles for at least 60 minutes. In some embodiments, the photoluminescent portion of the message 904 is charged with ambient lighting of less than 4 foot-candles for at least 60 minutes. In some embodiments, the photoluminescent portion of the message 904 is charged with ambient lighting of less than 2 foot-candles for at least 60 minutes. In some embodiments, the photoluminescent portion of the message 904 is charged with ambient lighting of less than 1.5 foot-candles for at least 60 minutes. In some embodiments, the photoluminescent portion of the message 904 is charged with ambient lighting of about 1.3 foot-candles for at least 60 minutes. An occupant 922 of the environment 920 can read the message 904 while the photoluminescent portion of the message 904 is being charged by the ambient lighting 924.

FIG. 15 shows the environment 920 subsequent to the removal of ambient lighting 924. The ambient lighting level of the environment 920 shown in FIG. 15 is 0 foot-candles. Subsequent to the eyes of the occupant 922 acclimating for 5 minutes immediately prior to observing the photoluminescent sign 900, the message 904 is readable by the occupant 922 at a viewing distance of 50 feet away from the photoluminescent sign 900 sign as measured along a line perpendicular to the message 904.

The photoluminescent sign 900 can comply with Underwriters Laboratories (UL) 924 standard for Standard for Safety of Emergency Lighting and Power Equipment. In some embodiments, the photoluminescent sign 900 is physically marked with an operational instruction indicating that a minimum of 1.3 foot-candles of fluorescent or LED light is required at all times the environment 920 is occupied. Further, in some embodiments, the physical marking specifies the photoluminescent sign 900 has a maximum viewing distance of 50 feet.

Photoluminescent signs in accordance with the present disclosure can beneficially be installed and used in a wide variety of "low light" environments that have low levels of ambient lighting (i.e., less than 5 foot-candles or 54 lux), and that otherwise may be unsuitable for use of conventional photoluminescent signs. Example low light environments include, but are not limited to, cinemas, theaters, hospitals, entertainment venues, and the like. Such environments may experience lengthy periods of low levels of ambient lighting conditions, wherein such lighting levels are less than 5 foot-candles, or even less than 2 foot-candles. For instance, hospital room lighting may be dimmed overnight for patient comfort, cinema lighting may be dimmed during movies, and other types of venues, such as theaters, may dim lighting during performances. Even in such low light ambient conditions, however, photoluminescent signs in accordance with the present disclosure can be adequately charged with the low level of ambient lighting in such environments. Accordingly, in the event that all ambient lighting is removed from the environment, the message of the photoluminescent signs can still be readable to occupants that are 50 feet away.

These and other embodiments of the systems and methods can be used as would be recognized by those skilled in the art. The above descriptions of various systems and methods are intended to illustrate specific examples and describe certain ways of making and using the systems disclosed and described here. These descriptions are neither intended to be nor should be taken as an exhaustive list of the possible ways in which these systems can be made and used. A number of modifications, including substitutions of systems between or among examples and variations among combinations can be made. Those modifications and variations should be apparent to those of ordinary skill in this area after having read this disclosure.

The invention claimed is:

1. A method, comprising:

positioning an exit sign comprising a substrate in an environment to provide an EXIT message to occupants of the environment, wherein the EXIT message comprises photoluminescent letters attached to the substrate, wherein each of the photoluminescent letters comprises a photoluminescent portion and a non-glowing border, wherein the exit sign is not connected to an electric power source, wherein the photoluminescent portion of each photoluminescent letter has a height of at least 170 mm, and wherein the non-glowing border of each photoluminescent letter has a width of at least about 2.5 mm, charging the photoluminescent letters with ambient lighting of less than 5 foot-candles for at least 60 minutes, wherein the ambient lighting is provided by any of unfiltered fluorescent lighting, metal halide lighting, mercury vapor lighting, and LED lighting, wherein upon removal of ambient lighting from the environment, the EXIT message is readable by occupants of the environment at a viewing distance of 50 feet away from the exit sign as measured along a line perpendicular to the EXIT message and subsequent to the occupants' eyes acclimating for 5 minutes immediately prior to reading the EXIT message.

2. The method of claim 1, wherein the charging the photoluminescent letters with ambient lighting of less than 5 foot-candles for at least 60 minutes comprises charging the photoluminescent letters with ambient lighting of less than 4 foot-candles for at least 60 minutes immediately prior to the removal of ambient lighting from the environment.

3. The method of claim 1, wherein the charging the photoluminescent letters with ambient lighting of less than 5 foot-candles for at least 60 minutes comprises charging the photoluminescent letters with ambient lighting of less than 2 foot-candles for at least 60 minutes immediately prior to the removal of ambient lighting from the environment.

4. The method of claim 1, wherein the charging the photoluminescent letters with ambient lighting of less than 5 foot-candles for at least 60 minutes comprises charging the photoluminescent letters with ambient lighting of less than 1.5 foot-candles for at least 60 minutes immediately prior to the removal of ambient lighting from the environment.

5. The method of claim 1, wherein the charging the photoluminescent letters with ambient lighting of less than 5 foot-candles for at least 60 minutes comprises charging the photoluminescent letters with ambient lighting of about 1.3 foot-candles for at least 60 minutes immediately prior to the removal of ambient lighting from the environment.

6. The method of claim 1, wherein the non-glowing border of each photoluminescent letter has a width of about 2.5 mm.

7. The method of claim 1, wherein the height of the photoluminescent portion of each photoluminescent letter is about 178 mm.

8. The method of claim 1, wherein the EXIT message comprises a photoluminescent directional indicator comprising a photoluminescent portion and a non-glowing border, wherein subsequent to the charging of the photoluminescent directional indicator with the ambient lighting of less than 5 foot-candles for at least 60 minutes, and upon the removal of ambient lighting from the environment, the photoluminescent directional indicator is readable by occupants of the environment at a viewing distance of 50 feet away from the exit sign subsequent to the occupants' eyes acclimating for 5 minutes immediately prior to reading the photoluminescent directional indicator.

9. The method of claim 8, wherein the photoluminescent portion of the photoluminescent directional indicator has a height of at least 80 mm and a width of at least 70 mm.

10. The method of claim 8, wherein:

the height of the photoluminescent portion of each photoluminescent letter is about 178 mm; and a height of the photoluminescent portion of the photoluminescent directional indicator is about 82 mm.

11. The method of claim 8, wherein the photoluminescent portion of the photoluminescent directional indicator has a thickness of about 4 mm.

12. The method of claim 1, wherein the photoluminescent portion of each photoluminescent letter has a thickness of about 4 mm.

13. The method of claim 1, further comprising marking the exit sign with an operational instruction indicating that a minimum of 1.3 foot-candles of fluorescent or LED light is required at all times the environment is occupied.

14. The method of claim 13, wherein the marking further specifies a maximum viewing distance of 50 feet.

15. The method of claim 1, wherein:

the substrate comprises a clear portion;

the photoluminescent letters are attached to the clear portion and comprise a first photoluminescent letter, a second photoluminescent letter, a third photoluminescent letter, and a fourth photoluminescent letter arranged relative to one another to provide the EXIT message; and with respect to each of the first photoluminescent letter, the second photoluminescent letter, the third photoluminescent letter, and the fourth photoluminescent letter:

the non-glowing border is reflective;

the photoluminescent portion facilitates visibility and readability of the letter without ambient lighting; and the non-glowing border facilitates visibility and readability of the letter in ambient lighting.

16. The method of claim 15, wherein the non-glowing portion is colored red or green.

17. The method of claim 1, wherein:

the substrate comprises a mirrored portion;

the photoluminescent letters are attached to the mirrored portion and comprise a first photoluminescent letter, a second photoluminescent letter, a third photoluminescent letter, and a fourth photoluminescent letter arranged relative to one another to provide the EXIT message; and with respect to each of the first photoluminescent letter, the second photoluminescent letter, the third photoluminescent letter, and the fourth photoluminescent letter:

the non-glowing border is reflective;

the photoluminescent portion facilitates visibility and readability of the letter without ambient lighting; and the non-glowing border facilitates visibility and readability of the letter in ambient lighting.

18. The method of claim 1, wherein:

the photoluminescent letters comprise a first photoluminescent letter, a second photoluminescent letter, a third photoluminescent letter, and a fourth photoluminescent letter arranged relative to one another to provide the EXIT message; and with respect to each of the first photoluminescent letter, the second photoluminescent letter, the third photoluminescent letter, and the fourth photoluminescent letter:

the non-glowing border is reflective;

the photoluminescent portion facilitates visibility and readability of the letter without ambient lighting; and the non-glowing border facilitates visibility and readability of the letter in ambient lighting.

* * * * *